United States Patent [19]
Workman et al.

[11] 3,870,547
[45] Mar. 11, 1975

[54] STARCH COATED FIBERS FOR EMBEDDING IN RESIN MATRIX FORMING MATERIALS AND COMPOSITES SO FORMED

[75] Inventors: Gerald B. Workman, Granville; Lawrence R. Deardurff, Newark, both of Ohio

[73] Assignee: Owens-Corning Fiberglas Corporation, Toledo, Ohio

[22] Filed: Jan. 24, 1974

[21] Appl. No.: 436,291

[52] U.S. Cl............... 117/72, 117/102 R, 117/62, 117/63, 117/126 GQ, 161/93, 161/170
[51] Int. Cl....................... C03c 25/02, C03c 25/00
[58] Field of Search........ 161/93, 170, 175; 117/62, 117/63, 126 GQ; 65/3; 104/210, 213

[56] References Cited
UNITED STATES PATENTS

| | | | |
|---|---|---|---|
| 2,633,428 | 3/1953 | Klug | 117/54 |
| 2,845,364 | 7/1958 | Waggoner | 117/54 X |
| 3,472,729 | 10/1969 | Sterman et al. | 161/93 |
| 3,556,754 | 1/1971 | Marsden et al. | 260/9 X |
| 3,664,855 | 5/1972 | Morrison et al. | 65/3 X |

Primary Examiner—George F. Lesmes
Assistant Examiner—Alan T. McDonald
Attorney, Agent, or Firm—Carl G. Staelin; John W. Overman; William P. Hickey

[57] ABSTRACT

Glass fibers coated with a mixture of starch, cationic silance of unsaturate functionality, and cationic and nonionic lubricants, which lubricants are dissolvable by the solvent of a matrix resin. The coated fibers are embedded in an unsaturated resin that is dissolved in said solvent, and the solvent of the syrup dissolves away the cationic and nonionic lubricants from the coatings on the fibers to allow the matrix resin to bond to the cationic, unsaturate functional silane without removing the starch.

11 Claims, No Drawings

STARCH COATED FIBERS FOR EMBEDDING IN RESIN MATRIX FORMING MATERIALS AND COMPOSITES SO FORMED

The present invention relates to new and improved coating materials for glass fibers that are to be used as a reinforcement for plastics, to new and improved coated fibers, and to new and improved methods of producing glass fiber reinforced plastics using the coated fibers.

BACKGROUND OF THE INVENTION

Ever since the start of the commercial production of glass fibers in continuous strands for use as textiles, etc. they have been coated with aqueous starch solutions. There is some discussion by chemists as to whether or not large starch molecules form true solutions or dispersions in water, but in any event they will be referred to herein as solutions. Until recently, all of the starches which were used were fully cooked so that the granules were fully dispersed into gelatinous film forming solutions in which the starch substantially completely covered the fibers in a film to protect the fibers during the numerous forming, twisting, quilling, beaming, and weaving operations that are required to produce woven materials. It is a property of glass that it scratches easily, and when once scratched, the fibers will break when bent sharply at guide eyes, etc.. It is imperative, therefore, that the fibers be completely and adequately separated from each other and from guide surfaces to prevent abrasion of the fibers; and the best material which has ever been found is a starch material containing minor amounts of cationic and nonionic lubricants.

Glass fibers have long been known to be an excellent reinforcement for thermosetting and thermoplastic resin materials; but prior to the present invention, it has never been possible to use starch coated fibers as a reinforcement for plastics without first burning off or otherwise removing the starch material. In one instance where a reinforced plastic having high impact strength was desired at the expense of other properties, large strands of glass fibers coated with starch were embedded in plastic; and in this case, the starch was purposely used as a barrier between the strand and the plastic to allow the glass fibers to move relative to each other when a concentrated load was applied thereto. By so doing the fibers would move and group together to absorb the concentrated load, but they did not bond to the matrix resin and provide the improved flex strength that is desired of a reinforcement.

Prior to the present invention, it was not possible to use starch coated fibers as a reinforcement for plastics, not only because the starch film formed a barrier between the fibers and resin, but because the starch is water sensitive. The prior art water sensitive starch film, even though embedded in the plastic, slowly absorbs water vapor or liquid as it diffuses through the plastic, and this water is retained by the starch film to leach out the alkali from the glass and produce cells of concentrated alkali which then attack the silica network of the fibers. In the conditions above described, the addition of organo-silane coupling agents to the starch base coatings are of no avail for bonding the plastic to the fibers because of the intervening starch film which acts as a barrier between the plastic matrix and the fiber reinforcement.

In the light of the above background, the art, in trying to produce a glass fiber reinforcement for plastic materials, found that a water base emulsion of polyvinyl acetate plus an organo-silane glass coupling agent could be used to coat the fibers provided that the fibers were not to be subjected to severe rubbing and flexing, such as occurs in twisting, beaming, and weaving operations. Polyvinyl acetate has the property of being dissolvable in plastics, including polyesters, so that the polyester resin could bond to the organo-silane coupling agent on the surface of the glass fibers. The glass fibers coated with polyvinyl acetate were and are used as continuous strands that are fed to "choppers," and are also used for producing woven rovings. Woven rovings are very loose weaves of large bundles of untwisted fibers that may include 60 or more strands. By handling 60 or more strands of the glass fibers as a unit, and by interlocking these strands in a very loose weave, it is possible to fabricate polyvinyl acetate coated glass fibers into a type of woven reinforcement.

There has been one other noteworthy process for producing a woven glass fiber reinforcement that is very difficult and costly to accomplish and so has only been used in glass fiber reinforcement materials for the "Space Program." In this process, glass fibers immediately after being generated in a molten state, are coated with an organic solution of an amino silane followed immediately by a second organic solution of an epoxy resin. A reaction occurs producing an incompletely cured epoxy coating which covers and protects the fibers; and thereafter the fibers are grouped into a strand and are coiled into a package. The strand from the package is twisted and woven into a fabric that is then used to reinforce epoxy materials. Because the silane and resin film former are applied to the fibers in the form of organic solutions, instead of aqueous solutions, it is necessary that special equipment and precautions be used to prevent the organic solvent vapors from contacting the red-hot equipment from which the molten glass issues. In addition, the strand, immediately after being formed into a coiled package, must be refrigerated to prevent the epoxy coating on the fibers from continuing its cure beyond the desired "B state" in which it exists when it is coiled into the package. Refrigeration is further used to prevent the coils of the strand from cementing together in the package, and to provide reactive sites in the epoxy coating which can bond to the later applied epoxy matrix forming material.

The principle object of the present invention, therefore, is the provision of a new and improved size or coating material for glass fibers which can be applied from an aqueous system, which will process through twisting and beaming in as good a manner as do the prior art glass fiber textile materials, and which nevertheless can be used as a reinforcement which will bond to organic resin matrix materials. Although men skilled in the art have desired to achieve the above stated object ever since the start of the art of producing glass fibers commercially, the fulfilling of the above object has not been possible until the present invention.

DESCRIPTION OF THE PREFERRED EMBODIMENTS

According to principles of the present invention it has been discovered that when a starch base coating is applied to glass fibers to form a film in which the starch film is broken up by emulsified particles of a nonionic lubricant, such as a wax or gelled oil, and a cationic silane having an unsaturated organo group thereon it is possible to dissolve out the nonionic lubricant particles which separate the starch granules and expose the glass surface and/or the silane coated glass surface to a resin matrix forming material provided it contains a select solvent. In order to withstand severe twisting, quilling, beaming, and weaving operations, the coatings should further include a cationic lubricant, apparently because the cationic lubricant migrates to and builds up upon guide surfaces to further protect the glass fibers. It further appears that only silanes that are both cationic and unsaturated are compatible with the starch films and do not adversely affect the processing characteristics of starch coated glass fibers. All other glass silane coupling agents adversely affect the processing of glass fiber textiles, and in particular, cause excessive broken filaments and fuzz during twisting, beaming and weaving.

According to further principles of the present invention the matrix forming resin materials in which the fibers are to be embedded should preferably include a solvent for these cationic lubricants as well as a solvent for the nonionic lubricants to produce still further exposure of the surface of the glass to the matrix forming resin materials. In those instances where the starch coating materials, or at least a preponderance of the starch coating materials, are present as swollen and unburst granules separated by the nonionic and cationic lubricants, the dissolving of the lubricants from the coating may additionally free the starch granules, or allow the mechanical manipulation and the flexing which occurs when matrix forming resin materials are forced in and around the fibers, to free the granular material from the surface of the glass where the starch granules then act as an inert filler material within the matrix resin. It will be seen that such mechanical manipulation further exposes the surface of the glass to the matrix forming resin material; and regardless of the extent of any one or all of the above described mechanisms, it has been found that the materials of the present invention produce a bond strength between the matrix forming resin and the glass fibers that is comparable to the polyvinyl acetate coated materials. It has long been the belief in the art that such could never be achieved with starch coated fibers.

According to a further subsidiary principle of the present invention, a further advantage is achieved when the swollen and unburst starch granules are of a type that has been chemically treated to form organic ethers or esters of the starch on the surface of the granules, and particularly ethers or esters of organic ring compounds. It will be understood that only the surface starch of the granules may become chemically derivatized to form the starch ether or ester, as the case may be, and that surface treatment only is sufficient in the present instance to provide a hydrophobic surface which desensitizes the starch granules to water. Glass fiber reinforced plastic materials of the present invention which incorporate such treated starch granules have almost as good strength retention after the 24-hour boil test in water as do plastic articles reinforced with the prior art polyvinyl acetate coated fibers.

EXAMPLE 1

An aqueous size was prepared of the following materials in the percentages by weight indicated:

| Materials | Percent by weight |
|---|---|
| Pearl starch | 3.54 |
| Granular benzylated starch | 1.19 |
| Granular rice starch | 0.23 |
| Paraffin wax | 1.19 |
| Nonionic lubricant (hydrogenated coconut oil) | 0.084 |
| Wax emulsifier (Durkees ICE #2) | 0.14 |
| Cationic lubricant (reaction product of tetraethylene pentamine and stearic acid in a molar ratio of 1 to 2) | 0.24 |

| Patent Number | 3406 | Folio Number | 227 |
|---|---|---|---|

| | Percent by weight |
|---|---|
| Wetting agent [alkyl phenoxypoly (ethyleneoxy) ethanol] | 0.06 |
| Catonic, unsaturated organofunctional silane glass coupling agent | 0.50 |

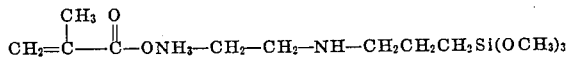

| | |
|---|---|
| Acetic acid | 0.50 |
| Water | Balance |

ICE No. 2 is a reaction product of mono and diglycerides with polysorbitan and a vegetable fat. The starch materials above were prepared by producing a slurry of the materials in the proportion of 0.6 pounds of the starch materials per gallon of water, and batch cooking at 182°F for 30 minutes. Approximately 90 percent of the total granular starch materials comprising the pearl starch, rice starch, and benzylated starch granules were swollen and unburst. The waxes, coconut oils, emulsifiers, and cationic lubricants are melted at approximately 190°F. and water is slowly added thereto with agitation until the inversion point is reached. These materials are then blended into the partially cooked starch slurry. The organo-silane coupling agent is mixed with a small amount of water and the acetic acid until dissolved and this mixture is then added to the starch slurry, and the balance of the water is added.

The starch slurry as above described was applied to 408 glass fibers immediately after being formed, which glass fibers have a diameter of between 0.00035 inch and 0.00040 inch. The coated glass fibers were gathered together into two strands of 204 filaments each, and these strands were wound separately in forming tubes spaced endwise on a single mandrel. The forming tubes were then allowed to air dry for 16 hours and the strand therefrom was twisted at the rate of 4 turns per inch in a clockwise direction and wound on twist bobbins with a "tapered build." Thereafter the strands from two such twist bobbins were pulled generally axially off of the tapered surface and plied together in a counterclockwise direction to stabilize the twist. The plied strand is referred to as plies or yarn. A woven reinforcement can be made in any suitable manner as by taking eight bobbins of the two plied twisted strand or yarn and winding them into quills for the fill and by beaming yarn from eight other twist bobbins to provide warp. These materials are woven using a warp of 18 plies per inch and a fill of 18 plies per inch. The sized fibers produces very little fuzz, dust, and broken filaments during the twisting, quilling, beaming, and weaving operations, and is comparable in performance with that of the best glass textile fibers that are produced by the assignee.

The above described fabric is made into a laminate by placing a syrup containing 30 percent styrene and 70 percent of the crosslinking unsaturated polyester resin described in Example 1 of Davis U.S. Pat. No. 3,615,979, and further containing 1 percent benzoyl peroxide on a polyethylene sheet. Ten layers of the woven cloth are placed on the resin and the fabric layers are rolled down upon the resin. Thereafter further resin syrup is placed on top and is rolled into the fabric until all layers are saturated. The resin saturated fabric layers are placed in a press and cured for 15 minutes at 225°F. The laminate so produced has substantially as good properties as do prior art laminates made from starch sized fibers that are heat-cleaned after weaving. The prior art starch fibers do not contain a silane coupling agent when formed. After heat-cleaning, however, a 1 percent solution is applied to the fibers before wetting out with the resin syrup.

Some of the yarn produced as above described was formed into reinforced polyester resin rods and tested according to the usual procedure. Forty plies of the coated strands were grouped together in parallel fashion and a pull cord was tied to the center of the grouped plies. The bundle so produced was immersed in a styrene solution of a polyester resin prepolymer which contained 10 percent styrene and 90 percent of a polyester prepolymer prepared by cooking 2.3 moles of propylene glycol and 2 moles of phthalic anhydride to an acid number of 35. The resin bath included 1.00 percent of benzoyl peroxide as a free radical catalyst. The pull string was inserted through a 15 inch long one quarter inch OD glass rod, and the glass rod containing the resin and fibers was placed in an oven at 240°F. for 55 minutes to cure. During cure, the polyester resin shrunk sufficiently that the glass fiber reinforced polyester rod could be forced out of the glass tube. This glass fiber reinforced rod was then laid on supports which were 2.1 inches apart and a ½ inch diameter rod was placed crosswise on the plastic rod half way between the supports. A load was applied to the half inch rod until ultimate failure occurred. This occurred at a load of 103.1 pounds to give a flexural strength of 157,000 pounds per square inch. Other rods similarly produced were boiled in water for 24 hours, and the flexural strength test was run on these rods in the same manner as above described. It was found that the strength of these rods had decreased only to 41 percent of the strength of the unboiled rods. This compares favorably to similar rods made from glass fibers that are coated with polyvinyl acetate, the best of which have a strength after boiling of approximately 80 percent of the original strength. The strength retention, therefore, of the materials produced using fibers coated with the sizes of the present invention when subjected to the moisture test above described, is favorable.

Examination of glass fibers, sized as above described, and placed in a styrene bath shows that the coating on the fibers is made very porous. The starch granular material is insoluble in styrene, and other tests show that the nonionic and cationic lubricants are leached out of the films leaving pores in the coating, and leaving the starch granules as particulate filler material. Other tests show that the cationic lubricants are soluble in water, benzene and styrene, but are only partially soluble in xylene, toluene, alcohols, acetones, ethers, perchloroethylene, and carbon tetrachloride, and are insoluble in Stoddard solvent. Other tests show that the nonionic lubricants, such as paraffin wax and hydrogenated vegetable oils, are soluble in alcohols and acetones, are slightly soluble in ether, and are soluble in benzene, styrene, xylene, toluenes, Stoddard solvent, perchloroethylene and carbon tetrachloride. Of these solvents, benzene and styrene were the only mutual solvents acceptable for both the cationic lubricant and the nonionic lubricant.

The procedures above described were repeated excepting that gamma-methacryloxypropyltrimethoxysilane was used in place of the cationic, unsaturated silane coupling agent. Test rods made of the untwisted yarn had strengths at least equal to those described above, but so much fuzz and broken filaments were experienced in twisting, etc. that a satisfactory woven material could not be produced.

EXAMPLE 2

The process of Example 1 is repeated excepting that benzylated starch as given in Example 1 was also substituted for the pearl starch and the rice starch. Fibers coated with this material twisted, quilled, and beamed almost as satisfactorily as did the material of Example 1, but had a slightly better strength retention after the moisture test.

The rice starch was used in Example 1 because of the smaller swollen granules which it produces to give a range in size of the swollen and unburst granules to aid in producing better separation between the fibers. Pearl starch was used because it is an inexpensive starch material which can be used to cheapen the coating where strength after the moisture test is not the controlling factor desired. Basically any granular starch material that is cooked so that much of the material remains in the swollen and unburst form will separate the fibers during processing and become a filler in the laminating resin. Preferably, more than 50 percent of the total starch materials of the coating should remain unburst. Some completely burst starch is necessary, however, to cement the granules together and provide body for the film that is formed on the fibers.

EXAMPLE 3

Test rods similar to those of Example 1 are produced excepting that a thermoplastic resin is used. The plies of yarn are immersed in a styrene solution containing 50 percent of a commercial grade of solid polystyrene and 1 percent of benzoyl peroxide. The wetted yarn is pulled up into the glass tube and is cured in an oven to polymerize the styrene. The cured rods so produced are substantially as strong as when produced from heat-cleaned fibers.

EXAMPLE 4

The process of Example 1 is repeated excepting that pearl starch cooked so that all of its granules are burst is used for the total starch materials including the benzylated and rice constituents. The coated fibers so produced process almost as well as those of Example 1 through twisting, quilling, beaming, and weaving, but have slightly less strength retention after the 24-hour boil test.

The amount of completely cooked starch which can be present in the film will depend to some degree on the total amount of solids in the film that is provided on the fibers. In thin films, an improvement can be had in the coupling effect to organic resins where all of the starch material is completely burst. Preferred materials, however, will contain 25 percent or more of the starch in the form of swollen and unburst starch granules, and good results are had when 75 to 90 percent of the starch is in the form of swollen and unburst starch granules.

Generally speaking, the nonionic lubricants can comprise any type of vegetable, animal or mineral waxes or oils that are unctuous in nature and which can normally serve as lubricants. Any suitable nonionic emulsifier can be used for the nonionic lubricant. Any cationic lubricant can be used, but as previously explained, those which contain a tertiary amine are preferred since their cationic nature remains even though the pH of the materials should become changed to neutral or slightly alkaline. Cationic lubricants are water soluble and therefore remain as water solutions so long as any water is present on the coated fibers. The surface tension of water is, of course, very great, and when fibers containing water and a cationic lubricant are pulled over guide surfaces, water containing the cationic lubricant is transferred to the guide surfaces. Guide surfaces are usually, but not necessarily, porcelain materials. It is believed that the positively charged portion of the cationic lubricant molecules is attracted to the surface of the porcelain or metallic surfaces of the guide eyes, leaving the lubricant portion of the molecules extending away from the surface. The cationic lubricant molecules become loosely attached to the guide surfaces, and therefore help to prevent scratching of the fibers as they are pulled over the guide surfaces to in this manner reduce the broken filaments, or fuzz which would otherwise be formed.

While all of the reasons why applicants' unique combination of materials and procedures avoids high frictions, fuzz, etc. during processing and weaving and still provides coupling to matrix resins is not known, it is postulated that the unsaturated organo tails on the silane molecules make the silane compatible with the laminating resins. The cationic nature of the organo groups causes the silane molecules to gather onto the surface of the glass rather than be distributed throughout the starch film that is formed on the glass fibers, and therefore, the silane molecules do not plate out upon guide surfaces, etc. to interfere with the lubrication provided by the nonionic and cationic lubricants. Silanes generally have poor lubricating qualities, and because they migrate out of the starch and congregate in a layer adjacent the surface of the glass fibers, they are not present in the outer surface of the starch layer to destroy the layer's lubricating properties. Also it is postulated, that benzene and styrene, when in the matrix forming materials, dissolve out both lubricants, as shown above, to permit coupling of the organo portions of the silane molecules with the matrix resin. Without such solvent action no such coupling is experienced.

It has been found that acceptable sizes can be made of the following materials in the percentages by weight indicated:

| Materials | Percent By weight |
|---|---|
| Starch | 0.5 – 7 |
| Nonionic lubricants | 0.2 – 5 |
| Cationic lubricants | 0.1 – 2.0 |
| Emulsifying agent | 0.05 – 1.0 |
| Cationic silane glass coupling agent having unsaturated organo functionality | 0.1 – 2.0 |

No improvement in strength is had when the coupling agent is used in quantities of more than 1 percent, but the use of more than 1 percent can be tolerated without making the total size formulation unaccepted for twisting, beaming, quilling, and weaving. Although some of the size ingredients migrate with the water during drying, the composition of the coating on the fibers after drying will be assumed hereafter and in the claims to comprise the same parts by weight as the percentages given above. The parts by weight of solids can be easily converted to percent solids.

Although starch films that are broken up by lubricant particles are operative, the preferred coating materials of the present invention comprise granular starch materials at least some of which, and preferably 25 percent of which have their surfaces chemically derivatized to form hydrophobic, oleophilic starch ethers and/or esters. It has been found that these materials when surrounded by water emulsions of the nonionic and cationic lubricants become coated with a film of the emulsified particles of nonionic lubricant. Cationic lubricants are water soluble, and it is believed that some of the cationic lubricant remains in the water surrounding the emulsified particles of nonionic lubricant and so is also present over the top of the oleophilic starch granules. It will be seen that the lubricant coated oleophilic granules are peculiarly adapted to be easily released from the size coating on the fibers by solvents for the cationic and nonionic lubricants. This is true whether the solvent is part of the laminating resin material or is a separate treatment for the coated fibers.

Glass fiber reinforced articles made from the coated glass fibers of the present invention will generally comprise at least 10 percent of the glass fibers, and 90 percent of the matrix or laminating resin and other fillers. The fillers may comprise up to 50% by weight of the composite materials. Where the fibers are in the form of woven twisted strands, it is possible to produce laminations in which the coated glass fibers comprise as much as approximately 75 percent of the composite materials, and the resin and particulate fillers comprise 25 percent of the composite materials. In such laminates the particulate fillers should be held to a minimum and should not exceed approximately 5 percent of the composite materials.

While the invention has been described in considerable detail, we do not wish to be limited to the particular embodiments described, and it is our intention to cover hereby all novel adaptations, modifications, and arrangements thereof which come within the practice of those skilled in the art to which the invention relates.

We claim:

1. In the process for producing glass fiber reinforced plastics wherein essentially bare glass fibers are coated with a size, and are then wound into a package, and following which the fibers are run through machinery and embedded into a liquid resin prepolymer that is cured insitu around the fibers to bond therewith, the improvement comprising: applying starch, emulsified particles of a nonionic lubricant, a water soluble cationic organic lubricant, and an organo-silane coupling agent which couples said liquid resin prepolymer to glass fibers that are devoid of interferring films in a manner causing said organo-silane to treat the glass and form a coating of starch, nonionic lubricant, and cationic lubricant over the organo-silane treated glass fiber surface; dissolving the nonionic lubricants and cationic lubricant out of the coating with a mutual solvent but in which the silane is not dissolvable to expose the silane treated surface of the glass fibers; and bonding a matrix resin prepolymer to the silane treated surface of the glass fibers.

2. The process of claim 1 wherein the materials are applied as an aqueous mixture comprising the following approximate percentages by weight of materials: from 0.5 to 7 percent of starch, from 0.2 to 5 percent of nonionic lubricant, from 0.1 to 2.0 percent of a cationic lubricant, from 0.05 to 1.0 percent of an emulsifying agent, and from 0.1 to 2.0 percent of a cationic silane glass coupling agent having unsaturated organo functionality.

3. The process of claim 1 wherein said dissolving step is accomplished by a solution of the matrix resin prepolymer containing said mutual solvent for the nonionic lubricant and the cationic lubricant.

4. The method of claim 1 wherein said dissolving step is accomplished by immersing the starch coated fibers in a bath of said mutual solvent to remove said lubricants before incorporating said fibers in said matrix resin prepolymer and bonding therewith.

5. The method of claim 4 wherein said fibers have said mutual solvent removed prior to incorporating in said prepolymer and said prepolymer is generally devoid of said mutual solvent.

6. The method of claim 5 wherein said matrix resin prepolymer is a polyester prepolymer containing a styrene solvent.

7. The method of claim 6 wherein said organo-silane in said aqueous starch mixture is an amino silane.

8. The method of claim 3 wherein said organo-silane is an acryloxy functional silane.

9. In the process for producing glass fiber reinforced plastics wherein essentially bare glass fibers are coated with a size, and are then wound into a package, and following which the fibers are run through machinery and embedded into a liquid resin prepolymer that is cured insitu around the fibers to bond therewith, the improvement comprising: preparing an aqueous mixture of starch containing swollen and unburst starch granules, emulsified particles of a nonionic lubricant, a water soluble cationic organic lubricant, and an organo-silane coupling agent having a radical that is reactive with said liquid resin prepolymer; applying said aqueous mixture to glass fibers that are devoid of interferring films to cause said organo-silane to treat the glass and form a coating of particles of starch, nonionic lubricant, and cationic lubricant over the organo-silane treated glass fiber surface; dissolving the nonionic lubricants and cationic lubricant out of the coating with a mutual solvent but in which the silane is not dissolvable to expose the silane treated surface of the glass fibers; and bonding a matrix resin prepolymer to the silane treated surface of the glass fibers.

10. The process of producing glass fibers for a reinforcement of a laminating resin containing a solvent from the group consisting of benzene and/or styrene, and wherein essentially bare glass fibers are coated with a size, and are then wound into a package, and following which the fibers are run through machinery and embedded into a prepolymer of the laminating resin, the improvement comprising: applying swollen and unburst starch granules, emulsified particles of a nonionic lubricant, a water soluble cationic organic lubricant, and an organo-silane coupling agent having a radical that is reactive with said laminating resin prepolymer to glass fibers that are generally devoid of interferring films in a manner causing said organo-silane to treat the glass and form a coating of particles of starch, nonionic lubricant, and cationic lubricant over the organo-silane treated glass fiber surface; causing the coated fibers to be embedded in a solution of said laminating resin containing benzene and/or styrene to dissolve the cationic and nonionic lubricants from between the starch granules, and causing the laminating resin to harden insitu with the organo-silane treated glass fibers.

11. The process of producing glass fibers for reinforcing a polyester laminating resin and wherein essentially bare glass fibers are coated with a size, and are then wound into a package, and following which the fibers are run through machinery and embedded into a prepolymer of the polyester laminating resin, the improvement comprising: applying a coating of an organo-silane coupling agent having a cationic and unsaturated organo group that is reactive with said laminating resin prepolymer to glass fibers that are generally devoid of interferring films in a manner causing said organo-silane to treat the glass; applying a coating of starch, emulsified particles of a nonionic lubricant, and a water soluble cationic lubricant over the silane coated fibers; dissolving the nonionic and cationic lubricants out of said coating; embedding the fibers in a polyester prepolymer; and causing said prepolymer to harden insitu around and to said silane treated fibers.

* * * * *